United States Patent
Morin

(10) Patent No.: US 9,344,840 B2
(45) Date of Patent: May 17, 2016

(54) WIRELESS APPLICATION PROTOCOL (WAP) APPLICATION LOCATION BASED SERVICES (LBS)

(75) Inventor: Drew Morin, Davidsonville, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 337 days.

(21) Appl. No.: 12/314,549

(22) Filed: Dec. 12, 2008

(65) Prior Publication Data

US 2009/0156185 A1    Jun. 18, 2009

Related U.S. Application Data

(60) Provisional application No. 61/006,013, filed on Dec. 14, 2007.

(51) Int. Cl.
| | |
|---|---|
| H04W 4/02 | (2009.01) |
| H04W 4/20 | (2009.01) |
| H04W 80/12 | (2009.01) |
| H04L 29/08 | (2006.01) |
| H04W 4/14 | (2009.01) |
| H04W 88/18 | (2009.01) |

(52) U.S. Cl.
CPC ............. *H04W 4/02* (2013.01); *H04L 67/02* (2013.01); *H04L 67/04* (2013.01); *H04L 67/18* (2013.01); *H04W 4/14* (2013.01); *H04W 4/20* (2013.01); *H04W 80/12* (2013.01); *H04W 88/182* (2013.01)

(58) Field of Classification Search
CPC .......... H04W 4/02; H04W 4/14; H04W 4/20; H04W 80/12; H04W 88/182; H04L 67/02; H04L 67/04; H04L 67/18

USPC ................ 455/456.3, 433, 422.1, 414.1, 457
See application file for complete search history.

(56) References Cited

U.S. PATENT DOCUMENTS

| | | | |
|---|---|---|---|
| 5,590,417 A | 12/1996 | Rydbeck | |
| 5,724,667 A | 3/1998 | Furuno | |
| 6,677,894 B2 | 1/2004 | Sheynblat | |
| 6,690,940 B1 | 2/2004 | Brown | |
| 6,842,449 B2 | 1/2005 | Hardjono | |
| 7,020,480 B2 | 3/2006 | Coskun | |
| 7,054,659 B2 | 5/2006 | Gioscia | |
| 7,123,874 B1 | 10/2006 | Brennan | |
| 7,260,644 B1 * | 8/2007 | Shah | H04L 67/1002 709/217 |
| D562,808 S | 2/2008 | Gwee | |
| 7,336,942 B2 * | 2/2008 | Wang | H04L 29/06 455/404.1 |

(Continued)

OTHER PUBLICATIONS 47 code of federal regulations (Oct. 1, 2005 Edition).

(Continued)

*Primary Examiner* — Mehmood B Khan

(74) *Attorney, Agent, or Firm* — Tarolli, Sundheim, Covell & Tummino LLP

(57) ABSTRACT

A Location Based Service (LBS) enabled Wireless Application Protocol (WAP) application operating in a microbrowser of a mobile device is given the ability to trigger a network initiated LBS request from a WAP application server. The WAP application server (or SMS gateway) acts as a proxy and issues an LBS request to a relevant LBS platform. In response, the WAP application server receives the requested location information from the LBS platform and initiates a WAP session with the mobile device using a WAP PUSH command. In this way, the WAP application running on the mobile device can act on requested and received LBS input from a network LBS platform.

17 Claims, 3 Drawing Sheets

(56) References Cited

U.S. PATENT DOCUMENTS

| | | | |
|---|---|---|---|
| 7,519,688 B2* | 4/2009 | Behrens | H04L 29/06 709/219 |
| 7,522,182 B2 | 4/2009 | Bang | |
| 7,603,148 B2 | 10/2009 | Michalak | |
| 7,693,546 B1 | 4/2010 | Gioscia | |
| 7,925,246 B2 | 4/2011 | McKibben | |
| RE42,927 E | 11/2011 | Want | |
| 8,126,458 B2* | 2/2012 | Zhu | H04W 64/00 455/432.1 |
| 8,200,291 B2 | 6/2012 | Steinmetz | |
| 8,265,326 B2 | 9/2012 | Singh | |
| 8,284,980 B2 | 10/2012 | Parker | |
| 2002/0013827 A1* | 1/2002 | Edstrom | H04L 29/12113 709/219 |
| 2002/0155844 A1 | 10/2002 | Rankin | |
| 2002/0168986 A1* | 11/2002 | Lau | G01C 21/3608 455/456.1 |
| 2003/0060214 A1* | 3/2003 | Hendrey et al. | 455/456 |
| 2003/0126271 A1* | 7/2003 | Mowry | H04L 29/06 709/230 |
| 2003/0147383 A1* | 8/2003 | Capers | H04W 4/12 370/356 |
| 2003/0157942 A1* | 8/2003 | Osmo | 455/456 |
| 2003/0169881 A1 | 9/2003 | Niedermeyer | |
| 2003/0186709 A1 | 10/2003 | Rhodes | |
| 2004/0054713 A1* | 3/2004 | Rignell | G06F 17/30899 709/203 |
| 2004/0077359 A1* | 4/2004 | Bernas | H04W 8/08 455/456.1 |
| 2004/0132465 A1 | 7/2004 | Mattila | |
| 2004/0137921 A1 | 7/2004 | Valloppillil et al. | |
| 2004/0176123 A1 | 9/2004 | Chin | |
| 2004/0198386 A1 | 10/2004 | Dupray | |
| 2004/0198389 A1 | 10/2004 | Alcock | |
| 2004/0203863 A1 | 10/2004 | Huomo | |
| 2004/0203900 A1 | 10/2004 | Cedervall | |
| 2004/0209594 A1 | 10/2004 | Naboulsi | |
| 2004/0254724 A1* | 12/2004 | Mattila | H04L 67/04 701/533 |
| 2004/0254993 A1* | 12/2004 | Mamas | H04L 12/5895 709/206 |
| 2005/0021769 A1 | 1/2005 | Kim | |
| 2005/0079877 A1 | 4/2005 | Ichimura | |
| 2005/0118999 A1 | 6/2005 | Zhu | |
| 2005/0149430 A1 | 7/2005 | Williams | |
| 2005/0197775 A1 | 9/2005 | Smith | |
| 2005/0221812 A9* | 10/2005 | Gailey | G06F 17/3043 455/422.1 |
| 2006/0025130 A1* | 2/2006 | Krishnamurthi | H04W 8/10 455/432.1 |
| 2006/0058102 A1 | 3/2006 | Nguyen | |
| 2006/0233317 A1 | 10/2006 | Coster | |
| 2006/0245406 A1* | 11/2006 | Shim | H04L 63/0272 370/338 |
| 2006/0258370 A1* | 11/2006 | Sudit | H04L 63/10 455/456.1 |
| 2006/0258371 A1* | 11/2006 | Krishnamurthi | H04W 4/02 455/456.1 |
| 2007/0004424 A1* | 1/2007 | Sheen et al. | 455/456.1 |
| 2007/0021098 A1 | 1/2007 | Rhodes | |
| 2007/0117574 A1 | 5/2007 | Watanabe | |
| 2007/0117577 A1 | 5/2007 | Harris | |
| 2007/0149208 A1 | 6/2007 | Syrbe | |
| 2007/0287475 A1* | 12/2007 | Jeong | H04W 4/02 455/456.6 |
| 2008/0014964 A1 | 1/2008 | Sudit | |
| 2008/0089303 A1* | 4/2008 | Wirtanen | H04W 76/064 370/342 |
| 2008/0268769 A1 | 10/2008 | Brown | |
| 2009/0029675 A1 | 1/2009 | Steinmetz | |
| 2009/0221263 A1 | 9/2009 | Titus | |
| 2010/0076767 A1 | 3/2010 | Vieri | |
| 2010/0167691 A1 | 7/2010 | Howarter | |
| 2010/0267398 A1* | 10/2010 | Kim | H04W 8/10 455/456.3 |
| 2011/1094468 | 5/2011 | Hirschfeld | |
| 2012/0157124 A1* | 6/2012 | Kim | G01S 5/0036 455/456.2 |

OTHER PUBLICATIONS

International Search Report in PCT/US2008/13690 dated Jul. 21, 2010.

PCT Search Report issued in PCT/US008/13690 and mailed on Jan. 29, 2009.

Kim, J.Y., et al., "An Enhanced VoIP Emergency Services Prototype," Proceedings of the 3rd International ISCRAM Conference, Newark, NJ, May 2006.

Extended Search Report in European Appl. No. 08862106.5 dated Jul. 6, 2015.

* cited by examiner

WIRELESS APPLICATION PROTOCOL (WAP) APPLICATION LOCATION BASED SERVICES (LBS)

The present invention claims priority from U.S. Provisional Application No. 61/006,013, entitled "WIRELESS APPLICATION PROTOCOL (WAP) APPLICATION LOCATION BASED SERVICES (LBS)" to Drew Morin, filed on Dec. 14, 2007, the entirety of which is expressly incorporated herein by reference.

BACKGROUND OF THE INVENTION

1. Field of the Invention

This invention relates generally to Wireless Application Protocol (WAP) applications. More particularly, it relates to Location Based Service (LBS) enabled Wireless Application Protocol (WAP) applications 2. Background of Related Art Wireless Application Protocol (WAP) is a global standard for defining an industry-wide standard specification for developing applications over wireless communication networks. The WAP specifications define a set of protocols in application, session, transaction, security, and transport layers, which enable operators, manufacturers, and applications providers to meet the challenges in providing advanced wireless services.

WAP also defines a wireless application environment (WAE) that allows operators, manufacturers, and content developers to develop advanced services and applications including a microbrowser, scripting facilities, e-mail, World Wide Web (WWW)-to-mobile-handset messaging, and mobile-to-telefax access, etc. Based on the Internet model, the wireless device contains a microbrowser, while content WAP applications are hosted on Web servers, commonly referred to as WAP application servers.

WAP browsers provide the basic services of a computer based web browser, but with simplified operation within the restrictions of a wireless device, such as smaller size, limited memory, restricted user inputs, etc. WAP sites are websites written in, or dynamically converted to, WML (Wireless Markup Language) and accessed via the WAP browser.

A location based service (LBS) provides informational services relating to the location of a device. LBS services are accessible by wireless devices through a wireless communication network. LBS makes use of the geographical position of wireless devices.

Conventionally, a user taking advantage of a WAP application, e.g., StreetFinder® (commercially available from TeleCommunication Systems, Inc. in Annapolis, Md.) can manually enter in their current position to retrieve data related to their current position. However, the present inventors have realized that this quickly becomes tiresome if a user desires to view information for a plurality of destinations, e.g., along a route to be traveled. An LBS application operates through a distinct servicing platform, it does not itself provide access to location information for use by a wireless device's WAP applications.

There is a need for a better system and method of directing location information to a WAP application hosted by a WAP application server.

SUMMARY OF THE INVENTION

In accordance with the principles of the present invention, a method and apparatus for providing location based services to a Wireless Application Protocol (WAP)-enabled wireless device, comprises receiving via a wireless network a WAP request from an application operating in a wireless device. A location based service (LBS) request is initiated to an LBS platform, in response to the WAP request. An LBS reply is received in response to the LBS request. Location information received in the LBS is provided to the wireless device.

In accordance with another aspect of the principles of the present invention, a method and apparatus for providing location based services to a Short Messaging Services (SMS)-enabled wireless device, comprises receiving via a wireless network an SMS request from an application operating in a wireless device. A location based service (LBS) request is initiated to an LBS platform, in response to the SMS request. An LBS reply is received in response to the LBS request. Location information received in the LBS is provided to the wireless device.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present invention introduces a technique and technology that permits a Location Based Service (LBS) enabled Wireless Application Protocol (WAP) application to trigger a network initiated LBS request from a WAP application server. The WAP application server essentially issues an LBS request to an LBS platform. The WAP server receives location information from the LBS platform, and initiates a WAP session with the mobile device through a WAP PUSH. The WAP application then acts on the requested LBS input.

In an alternate aspect, the present invention introduces a technique that permits a Location Based Service (LBS) enabled Wireless Application Protocol (WAP) application to trigger a network initiated LBS request from a mobile device. In operation, an LBS platform determines location information for a requesting mobile device, and returns the location information to the mobile device. The location information is made available to the WAP application via a WAP application server. The WAP application server services the WAP application with LBS input from the received location information.

Figure 1:
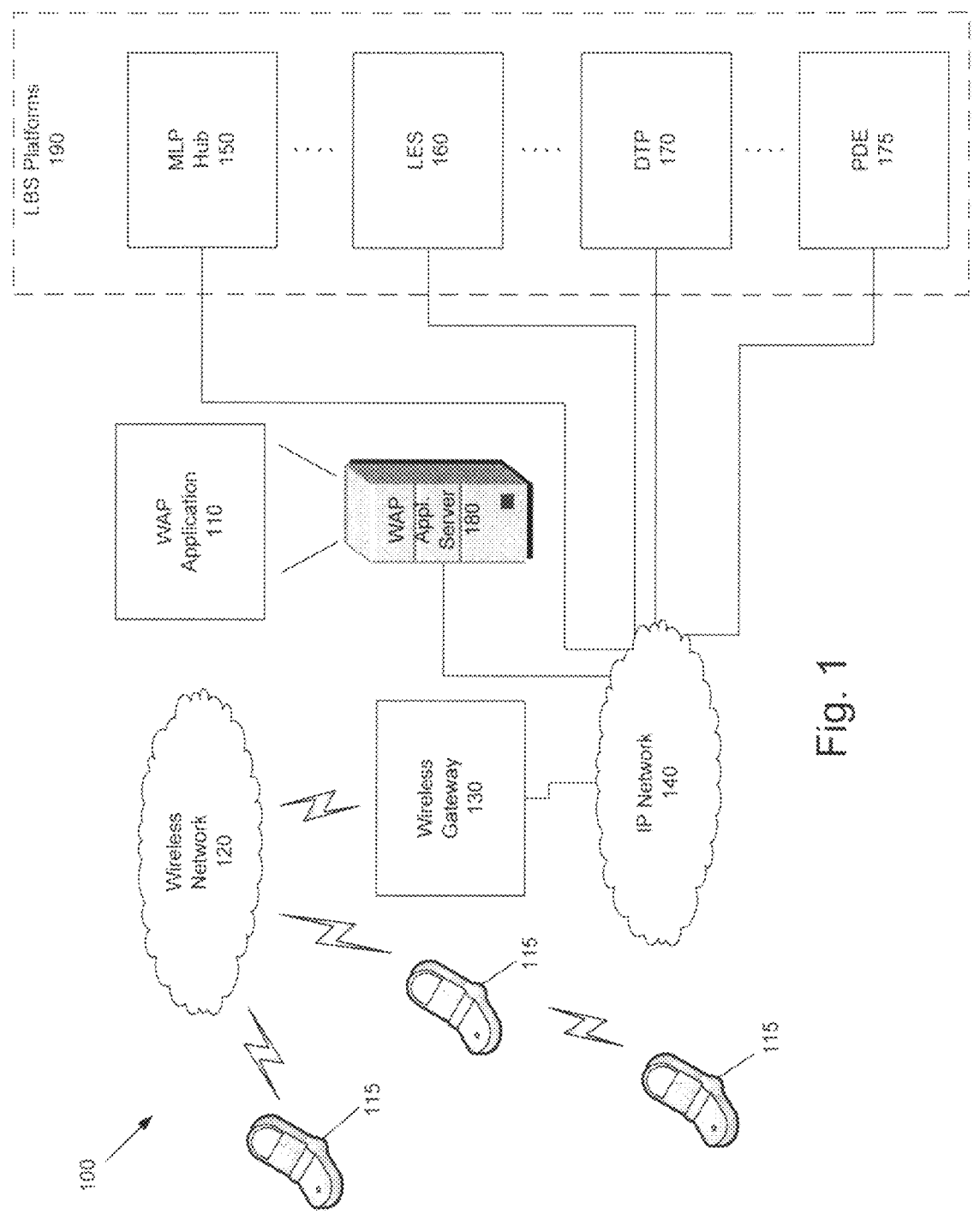
FIG. 1 shows a system for servicing an LBS enabled WAP application, in accordance with the principles of the present invention.

FIG. 1 shows a system for servicing an LBS enabled WAP application, in accordance with the principles of the present invention.

In particular, as shown in FIG. 1, a system 100 for servicing an LBS enabled WAP application 110 includes a mobile devices 115, a wireless network 120, a wireless gateway 130, an IP network 140, a WAP application server 180, and LBS platforms 190.

In accordance with the principles of the present invention, the WAP application server 180 hosts an LBS enabled WAP application, hereafter referred to as a "WAP application" 110. The WAP application 110 can be hosted as a conventional WAP application, but in accordance with the principles of the invention is permitted to trigger a network initiated LBS request via the WAP application server 180.

The LBS platforms 190 provide location services for mobile devices 115. Exemplary LBS platforms can include, e.g., a Mobile Location Protocol (MLP) Hub 150, a Location Enabling Server (LES) 160, an architecture specific Direct to Platform (DTP) 170, a Position Determining Entity (PDE) 175, etc. The LBS platforms 190 are accessible over the IP network 140.

The mobile devices 115 may be any suitable mobile wireless device that supports WAP and is able to execute a WAP application 110. Exemplary mobile devices 115 that support WAP include, e.g., a cellular telephone, a PDA, a laptop computer, etc. The mobile devices 115 are capable of accessing the WAP application server 180 through a suitable wireless network 120 and/or IP network 140 (e.g., the Internet).

The exemplary mobile devices 115 are preferably capable of supporting multiple WAP sessions simultaneously, to reduce the need to drop a session and reinitiate a WAP application 110 when moving back and forth between WAP sessions.

Alternatively, the application (WAP or SMS Gateway) server can be triggered based on the device request or application state to establish a session with the LBS server to locate the mobile device. The LBS server, independent of the WAP session, can establish a location determination session with the mobile device tunneled through an Internet Protocol session out of band with the WAP session. Once calculated, the location response is then provided back to the application server or alternatively to the device.

In accordance with the principles disclosed herein, the invention can be implemented even with updated WAP version release(s).

Alternately, the mobile devices 115 may be any suitable mobile device capable of supporting Short Message Service (SMS) messaging. In accordance with the principles of the present invention, the mobile device 115 may use SMS to initiate an LBS query, similar to the WAP initiated LBS query.

The wireless network 120 may be a wireless network based on any suitable variety of digital communication technologies, e.g., Code Division Multiple Access (CDMA), Global System for Mobile Communications (GSM), etc.

The mobile device 115 is capable of executing a microbrowser, with content and a WAP application 110 hosted on the WAP application server 180. Through the use of the microbrowser, the WAP application server 180 receives a request for a particular WAP application 110, and services that WAP application 110 through the establishment of a WAP session between the mobile device 115 and the WAP application server 180.

The mobile device 115, the WAP application server 180, and the LBS platform 190 preferably all support multiple WAP sessions simultaneously. Moreover, the mobile device 115, the WAP application server 180, and the LBS platform 190 preferably support IP sessions simultaneously with WAP sessions.

Scenario 1: WAP Application Initiated by Subscriber

In accordance with a first aspect of the present invention, a WAP application 110 is an LBS enabled WAP application. A user of the mobile device 115 selects a desired WAP application 110, e.g., StreetFinder® through the microbrowser. The WAP application 110, in turn, triggers an IP network 140 initiated LBS request from the WAP application server 180 to any one of the LBS platforms 190.

In response to the LBS request, the WAP application server 180 acts as a proxy and initiates a suitable request to any one of the LBS platforms 190. At this point the WAP application server 180 preferably notifies the particular mobile device 115 operating the WAP application 110 that an LBS request to an LBS platform 190 has been initiated.

Preferably the WAP application server 180 can terminate the WAP session. Alternatively, if the mobile device 115 supports multiple simultaneous WAP sessions, the WAP session associated with the WAP application 110 can be left open.

The relevant LBS platform 190 initiates an IP network 140 initiated LBS request using a WAP PUSH command, with the mobile device 115 having pre-authorized such an LBS request. In response to the LBS request, the relevant LBS platform 190 determines a location of the mobile device 115.

Location of the mobile device can be determined in any number of suitable ways, e.g., using a Global Positioning System (GPS), Assisted GPS (AGPS), Control Plane, User Plane, various variations of Time Difference of Arrival (TDOA), Uplink Time Difference of Arrival (UTDOA), etc.

The relevant LBS platform 190 returns a location of the mobile device 115 to the WAP application server 180. The WAP application server 180 then terminates the WAP session associated with the return of the location of the mobile device 115 to the WAP application server 180. Alternatively, if the WAP application service 180 supports multiple simultaneous WAP sessions, the WAP session associated with the return of the location of the mobile device 115 to the WAP application server 180 may be left open.

The WAP application server 180 then initiates a WAP session with the mobile device 115 through the use of a WAP PUSH command. The WAP application 110 then acts on the requested LBS input.

Scenario 2: WAP Application Initiated by Subscriber

In accordance with another aspect of the present invention, the WAP application 110 is LBS enabled. When the user of the mobile device 115 selects or runs the LBS enabled WAP application 110 (e.g., StreetFinder®) in their microbrowser, the WAP application 110 triggers an IP network 140 initiated LBS request initiated and sent by the WAP application server 180 to any one of the LBS platforms 190.

Any of the LBS Platforms 190 initiates an IP network 140 initiated LBS request using a WAP PUSH command, the mobile device 115 having pre-authorized such an LBS request. Alternatively, any of the LBS platforms 190 can initiate an IP network 140 initiated LBS request over an existing WAP session.

In response to the LBS request, the relevant LBS platform 190 determines a location of the mobile device 115. The location of the mobile device can be determined in any number of ways, e.g., using a Global Positioning System (GPS), Assisted GPS (AGPS), Control Plane, Uplink Time Difference of Arrival (UTDOA), etc.

The relevant LBS platform 190 returns a location of the mobile device 115 to the WAP application server 180. The WAP application server 180 can then terminate the WAP session associated with the return of the location of the mobile device 115 to the WAP application server 180. Alternatively, if the WAP application service 180 supports multiple simultaneous WAP sessions, the WAP session associated with the return of the location of the mobile device 115 to the WAP application server 180 can be left open.

The WAP application server 180 then initiates a WAP session with the mobile device 115 through the use of a WAP PUSH command. The WAP application 110 is then able to act on the received LBS input.

Scenario 3: WAP Application Initiated by Subscriber

In accordance with yet another aspect of the present invention, the WAP application 110 is LBS enabled. When the user of the mobile device 115 selects or runs the LBS enabled WAP application 110 (e.g., StreetFinder®) in their microbrowser, the mobile device 115 triggers the mobile device 115 to initiate an LBS request from any of the LBS platforms 190.

In response to the LBS request, the relevant LBS platform 190 determines a location of the mobile device 115. The location of the mobile device can be determined in any number of ways, e.g., using a Global Positioning System (GPS), Assisted GPS (AGPS), Control Plane, Uplink Time Difference of Arrival (UTDOA), etc.

The relevant LBS platform 190 returns a location of the mobile device 115 to the mobile device 115. The location of the mobile device 115 is then made available to the WAP application server 180 through a WAP session. The WAP application server 180 services the WAP application 110 with LBS input from the received location information.

Figure 2:
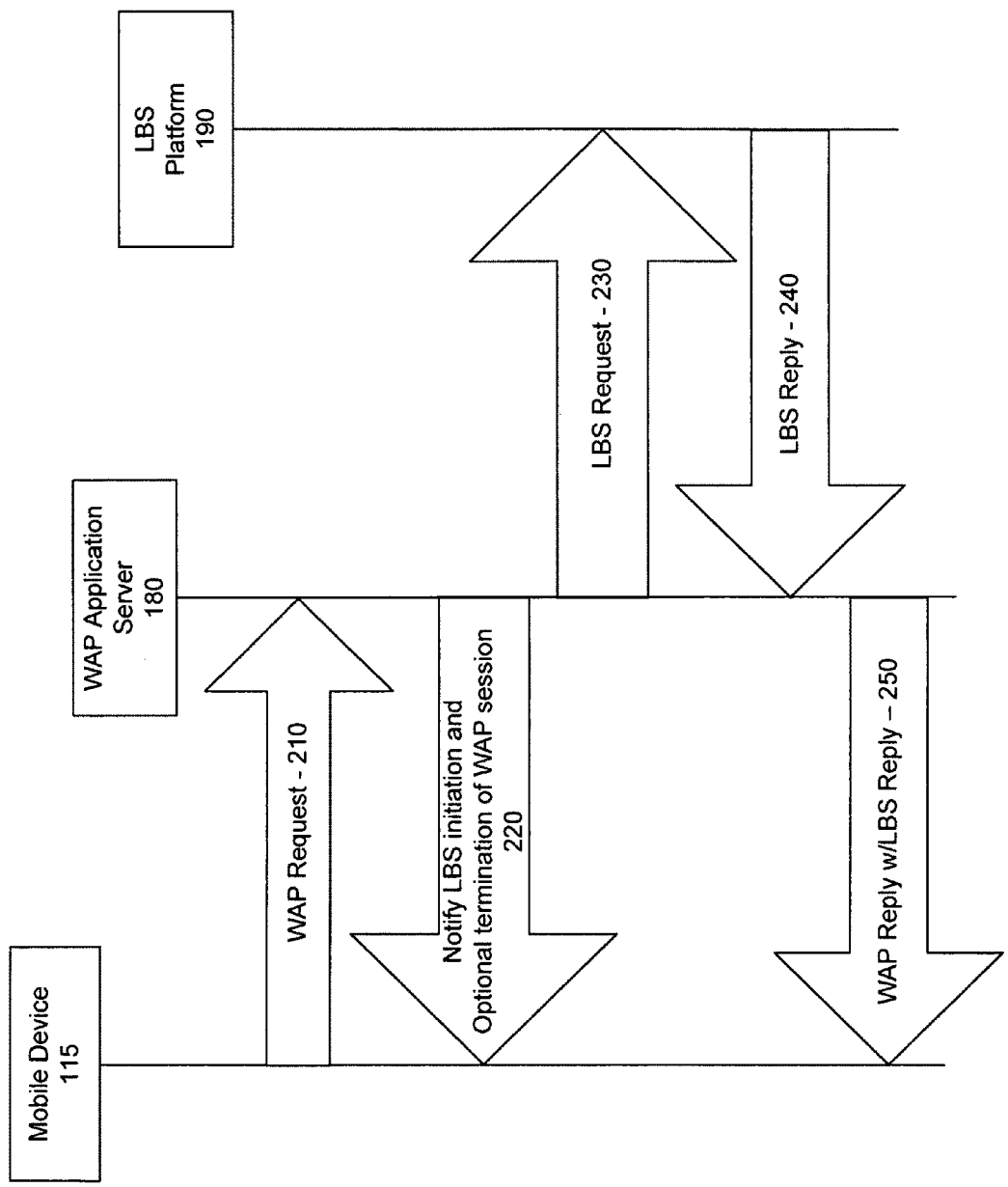
FIG. 2 shows an exemplary signal flow for servicing an LBS enabled WAP application, in accordance with the principles of the present invention.

FIG. 2 shows an exemplary signal flow for servicing an LBS enabled WAP application, in accordance with the principles of the present invention.

In particular, as shown in FIG. 2, a WAP request 210 is initiated from a mobile device 115 that selects a WAP application 110. The WAP request 210 is issued from the mobile device 115 to the WAP application server 180.

The WAP application server 180 then responds to the WAP request 210 in step 220 (included in scenario 1, omitted from scenario 2). In step 220, the WAP application server 180 notifies the mobile device 115 that the request for location from an LBS platform 190 has been initiated.

An LBS request 230 is then passed from the WAP application server 180 to a relevant LBS platform 190. The LBS request includes identification of the particular mobile device 115 issuing the WAP request, so that location for that particular mobile device 115 can be determined.

An LBS reply 240 is then passed from the relevant LBS platform 190 to the WAP application server 180. The LBS reply 240 includes the requested location information for the particular mobile device 115 that initiated the WAP request. A WAP session can be used as a communication path for the LBS reply.

Lastly, a WAP Reply with LBS reply 250 is passed from the WAP application server 180 to the requesting mobile device 115. The WAP reply 250, which can be in the form of a WAP Push, preferably includes the location information provided by the LBS reply 240 from the relevant LBS platform 190.

Now in possession with the requested location information, the mobile device 115 running the WAP application 110 may act on the LBS input.

Figure 3:
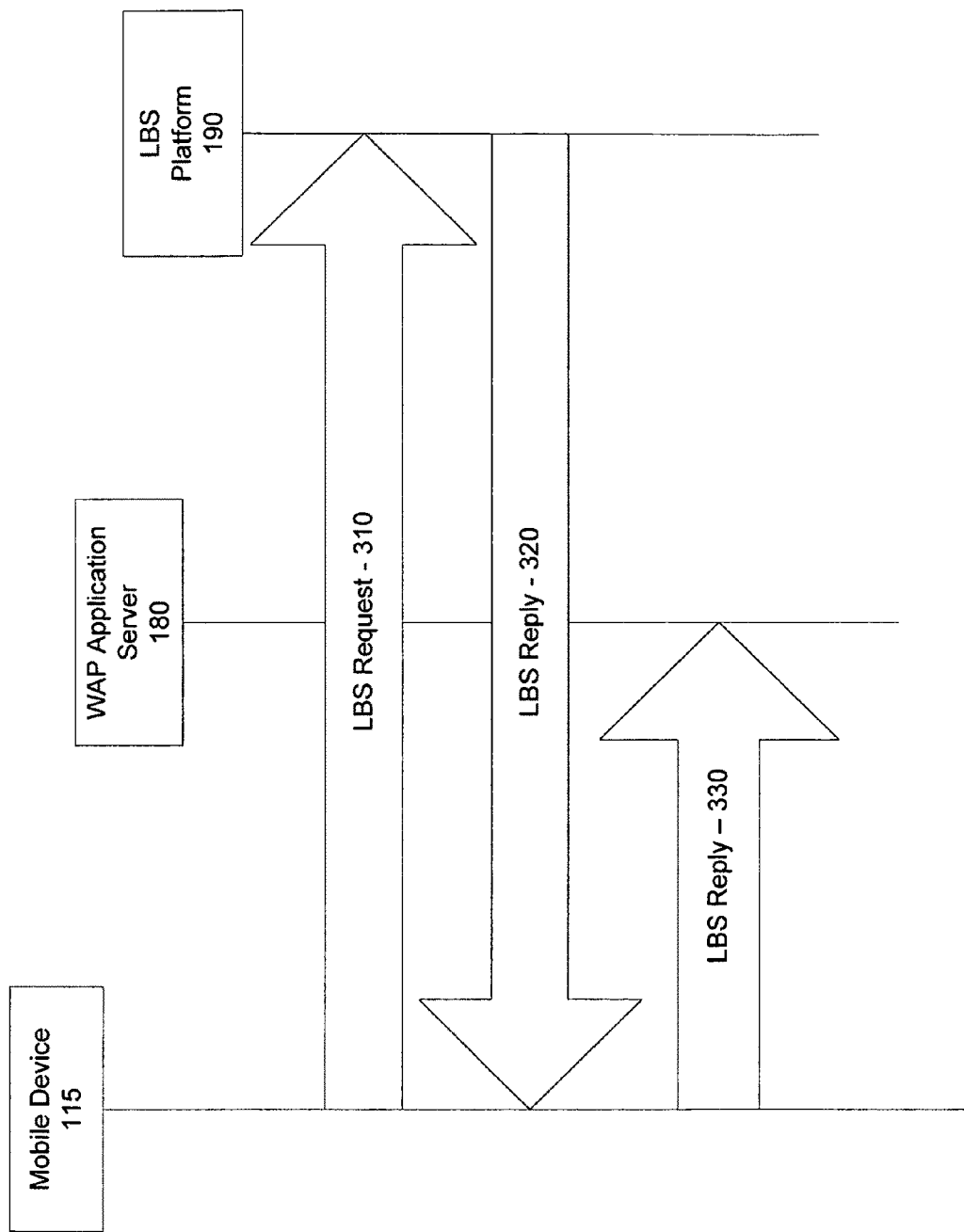
FIG. 3 shows an exemplary signal flow for servicing an LBS enabled WAP application, in accordance with the principles of the present invention.

FIG. 3 shows an exemplary signal flow for servicing an LBS enabled WAP application, in accordance with the principles of the present invention.

In particular, a mobile device 115 running a suitable microbrowser selects and executes an appropriate WAP application 110. Then, at an appropriate time, the WAP application on the mobile device 115 initiates an LBS request 310 directly to a relevant LBS platform 190. In this example, the LBS request 310 is passed from the mobile device 115 to the LBS platform 190.

In response, an LBS reply 320 is then passed from the LBS platform 190 to the mobile device 115. The LBS reply includes the requested location information obtained by the LBS platform 190.

It is at this point that an LBS reply is returned from the mobile device 115 to the WAP application server 180. The LBS reply preferably includes the location information returned in the LBS reply 320 from the LBS platform 190.

The WAP application 110 then acts on its requested LBS input.

While the invention has been described with reference to the exemplary embodiments thereof, those skilled in the art will be able to make various modifications to the described embodiments of the invention without departing from the true spirit and scope of the invention.

The invention claimed is:

1. A method of providing location based services to a Wireless Application Protocol (WAP)-enabled wireless device, comprising:
    initiating, at the wireless device, a WAP session between the wireless device and a physical WAP application network server;
    receiving, at said physical WAP application network server, via a physical wireless network, a mobile-triggered request for a network-initiated location-based services (LBS) request for location of said wireless device, from said wireless device;
    terminating, at the physical WAP application network server, the WAP session in response to receiving said mobile-triggered request;
    in response to said mobile-triggered request for a network-initiated LBS request, initiating said requested network-initiated location based service (LBS) request from said physical WAP application network server to a physical LBS network location services server for location information;
    receiving, at said physical WAP application network server from said physical LBS network server, said location information from said physical LBS network server; and
    pushing, in response to said mobile-triggered request and said terminating, said network-initiated location information from said physical LBS network server using a WAP PUSH command issued at said physical WAP application network server, to said wireless device.

2. The method of providing location based services to a Wireless Application Protocol (WAP)-enabled wireless device according to claim 1, wherein:
    said location information is provided to said wireless device using a WAP reply.

3. The method of providing location based services to a Wireless Application Protocol (WAP)-enabled wireless device according to claim 1, wherein:
    said physical WAP application network server supports multiple simultaneous WAP sessions.

4. The method of providing location based services to a Wireless Application Protocol (WAP)-enabled wireless device according to claim 1, further comprising:
    notifying said wireless device that contact with said physical LBS network server has been initiated.

5. The method of providing location based services to a Wireless Application Protocol (WAP)-enabled wireless device according to claim 1, further comprising:
    permitting activation of a microbrowser in said wireless device.

6. The method of providing location based services to a Wireless Application Protocol (WAP)-enabled wireless device according to claim 1, wherein:
    said wireless device is a wireless phone.

7. The method of providing location based services to a Wireless Application Protocol (WAP)-enabled wireless device according to claim 1, wherein:
    said network-initiated LBS request is a Mobile Location Protocol (MLP) request.

8. The method of providing location based services to a Wireless Application Protocol (WAP)-enabled wireless device according to claim 1, wherein:
   said network-initiated LBS request is a Location Enabling Server (LES) request.

9. The method of providing location based services to a Wireless Application Protocol (WAP)-enabled wireless device according to claim 8, wherein:
   said LES request triggers an Assisted Global Positioning System (AGPS) location determination for said wireless device.

10. A physical network Wireless Application Protocol (WAP) server to provide location based services to a WAP-enabled wireless device, comprising:
   a receiver, at said physical WAP application network server, to receive via a physical wireless network, a mobile-triggered request for a network-initiated location-based services (LBS) request for location of said wireless device via a given WAP session, from said wireless device;
   an initiator, at said physical WAP application network server, to initiate said requested network-initiated location based service (LBS) request from said physical WAP application network server to a physical LBS network location services server for location information, in response to said mobile-triggered request;
   said receiver, at said physical WAP application network server, to receive said location information from said physical LBS network server; and
   a WAP PUSH session module, at said physical WAP application network server, to push using a WAP PUSH command via another WAP session issued at said physical WAP application network server, in response to said mobile-triggered request, said network-initiated location information from said physical LBS network server to said wireless device.

11. The Wireless Application Protocol (WAP) server to provide location based services to a WAP-enabled wireless device according to claim 10, wherein:
   said physical WAP application network server supports multiple simultaneous WAP sessions.

12. The Wireless Application Protocol (WAP) server to provide location based services to a WAP-enabled wireless device according to claim 10, further comprising:
   notify said wireless device that contact with said physical LBS network server has been initiated.

13. The Wireless Application Protocol (WAP) server to provide location based services to a WAP-enabled wireless device according to claim 10, further comprising:
   permitting activation of a microbrowser in said physical wireless device.

14. The Wireless Application Protocol (WAP) server to provide location based services to a WAP-enabled wireless device according to claim 10, wherein:
   said wireless device is a wireless phone.

15. The Wireless Application Protocol (WAP) server to provide location based services to a WAP-enabled wireless device according to claim 10, wherein:
   said network-initiated LBS request is a Mobile Location Protocol (MLP) request.

16. The Wireless Application Protocol (WAP) server to provide location based services to a WAP-enabled wireless device according to claim 10, wherein:
   said network-initiated LBS request is a Location Enabling Server (LES) request.

17. The Wireless Application Protocol (WAP) server to provide location based services to a WAP-enabled wireless device according to claim 16, wherein:
   said LES request triggers an Assisted Global Positioning System (AGPS) location determination for said wireless device.

* * * * *